United States Patent
Menon et al.

(10) Patent No.: US 11,246,097 B2
(45) Date of Patent: Feb. 8, 2022

(54) METHOD AND APPARATUS FOR PROVIDING LINK QUALITY BASED RECEPTION SLEEP MODE FOR NARROWBAND INTERNET OF THINGS DEVICES

(71) Applicant: QUALCOMM Incorporated, San Diego, CA (US)

(72) Inventors: Srikanth Menon, Hyderabad (IN); Raghavendra Shyam Ananda, Hyderabad (IN); Praveen Maruthoormana Purushothaman, Ernakulam (IN)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 16/833,443

(22) Filed: Mar. 27, 2020

(65) Prior Publication Data
US 2020/0322890 A1  Oct. 8, 2020

(30) Foreign Application Priority Data
Apr. 3, 2019 (IN) .............................. 201941013476

(51) Int. Cl.
*H04W 52/02* (2009.01)
*H04W 4/70* (2018.01)
*H04W 24/10* (2009.01)

(52) U.S. Cl.
CPC ......... *H04W 52/0245* (2013.01); *H04W 4/70* (2018.02); *H04W 24/10* (2013.01)

(58) Field of Classification Search
CPC .... H04W 24/10; H04W 4/70; H04W 52/0245
(Continued)

(56) References Cited

U.S. PATENT DOCUMENTS

2013/0230028 A1\*  9/2013  Calcev .................. H04L 1/0002
                                                                        370/336
2017/0230780 A1    8/2017  Chincholi et al.
(Continued)

OTHER PUBLICATIONS

CATT: "NR Radio Link Monitoring", 3GPP Draft, R1-1710038, NR Radio Link Monitoring, 3rd Generation Partnership Project (3GPP), Mobile Competence Centre, 650, Route Des Lucioles, F-06921 Sophia-Antipolis Cedex, France, vol. RAN WG1, No. Qingdao, P.R. China, Jun. 27, 2017-Jun. 30, 2017, Jun. 17, 2017 (Jun. 17, 2017), XP051304766, 6 pages, Retrieved from the Internet: URL: http://www.3gpp.org/ftp/tsg_ran/WG1_RL1/TSGR1_AH/NR_AH_1706/Docs/. [retrieved on Jun. 17, 2017] the whole document.
(Continued)

*Primary Examiner* — Gbemileke J Onamuti
(74) *Attorney, Agent, or Firm* — Holland & Hart LLP

(57) ABSTRACT

In an aspect of the disclosure, a method, a computer-readable medium, and an apparatus are provided. The apparatus may be a narrowband Internet of thing (NB-IoT) user equipment (UE). Further, the apparatus may be configured to receive NB reference signals (NRS) on a NB channel during a gap between reception events, perform link quality measurements based on the NRS received during an evaluation time interval, the evaluation time interval being shorter than the gap between the reception events, determine whether a link quality is greater than or equal to a first threshold, during the evaluation time interval, based on the link quality measurements, and determine whether to enable an autonomous reception (RX) sleep mode for a remaining duration of the gap between the reception events based at least in part on determining whether the link quality is greater than or equal to the first threshold value.

30 Claims, 13 Drawing Sheets

(58) Field of Classification Search
USPC .......................................................... 370/252
See application file for complete search history.

(56) References Cited

U.S. PATENT DOCUMENTS

2019/0036647 A1    1/2019  Gowda et al.
2020/0229053 A1*   7/2020  Pakniat ........... H04W 36/00837

OTHER PUBLICATIONS

Ericsson: "Measurement reporting in NB-IOT", 3GPP Draft, R2-1802570, Measurement reporting in NB-IOT, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 26, 2018-Mar. 2, 2018, Feb. 16, 2018 (Feb. 16, 2018), XP051400188, 7 pages, Retrieved from the Internet: URL: http://www.3gpp.org/ftp/tsg%5Fran/WG2%5FRL2/TSGR2%5F101/Docs/. [retrieved on Feb. 16, 2018] section 6; p. 7.
International Search Report and Written Opinion—PCT/US2020/026297—ISA/EPO—dated Jul. 9, 2020.

* cited by examiner

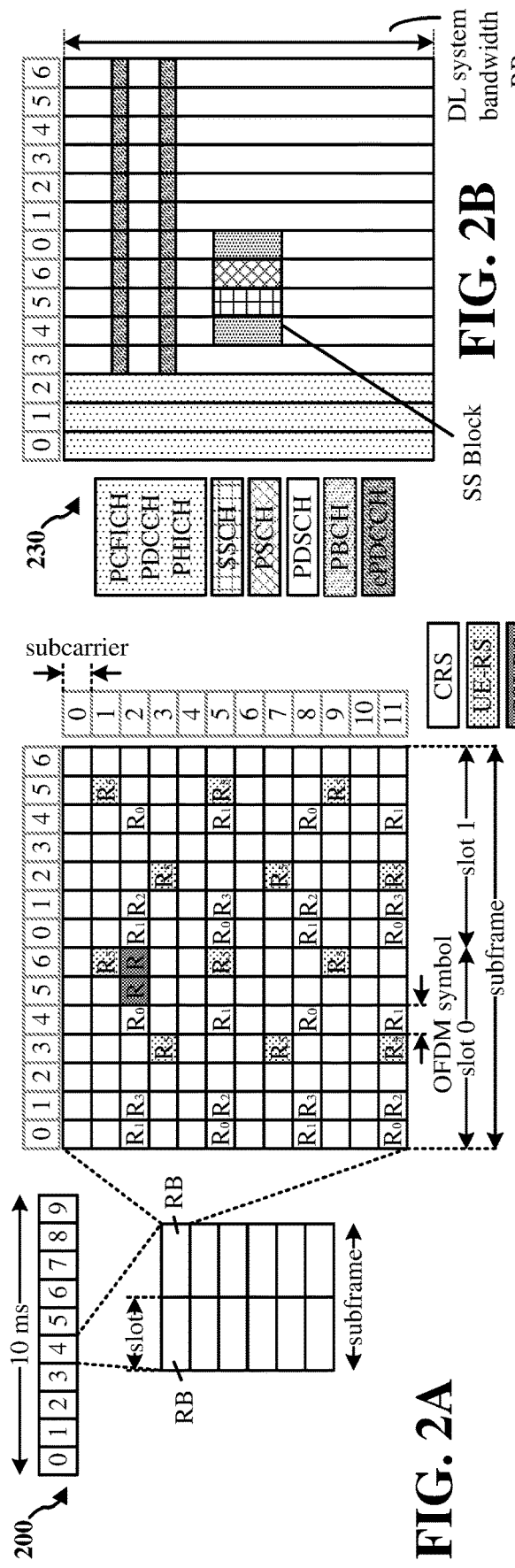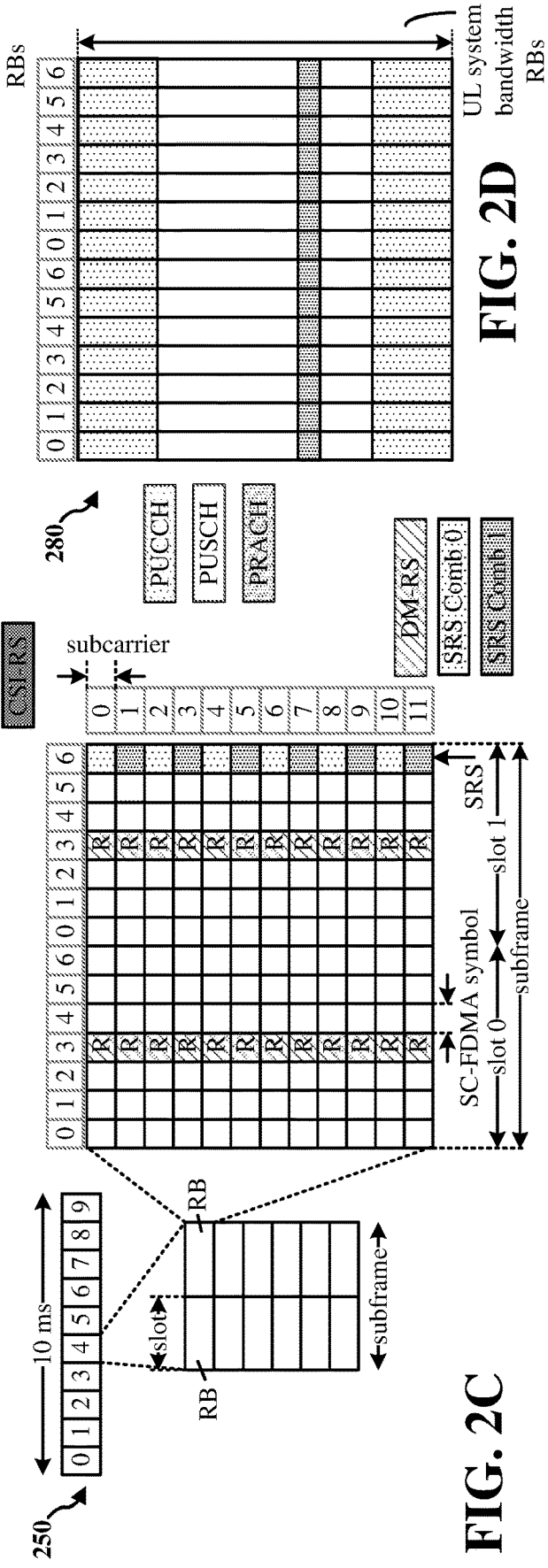

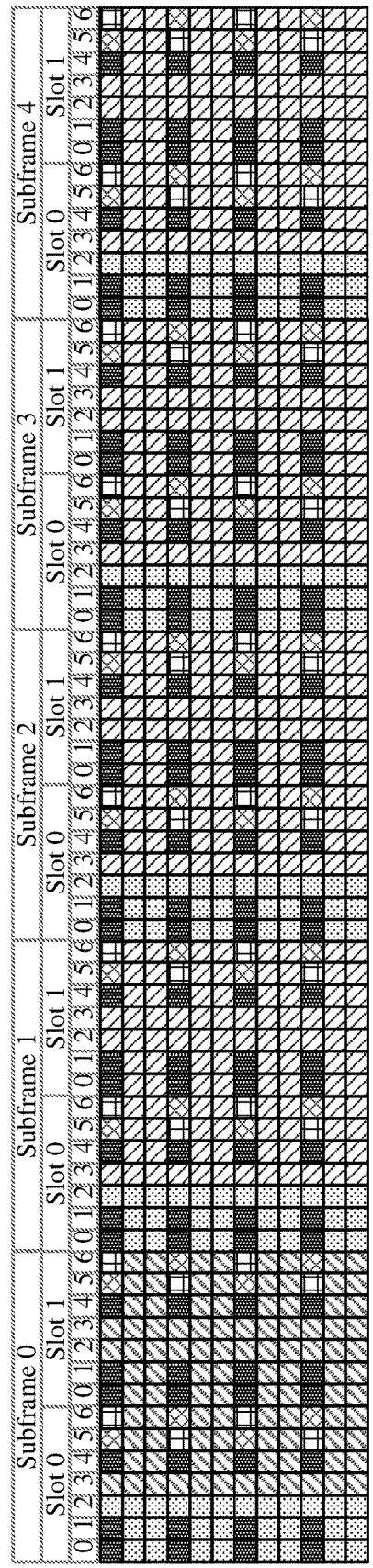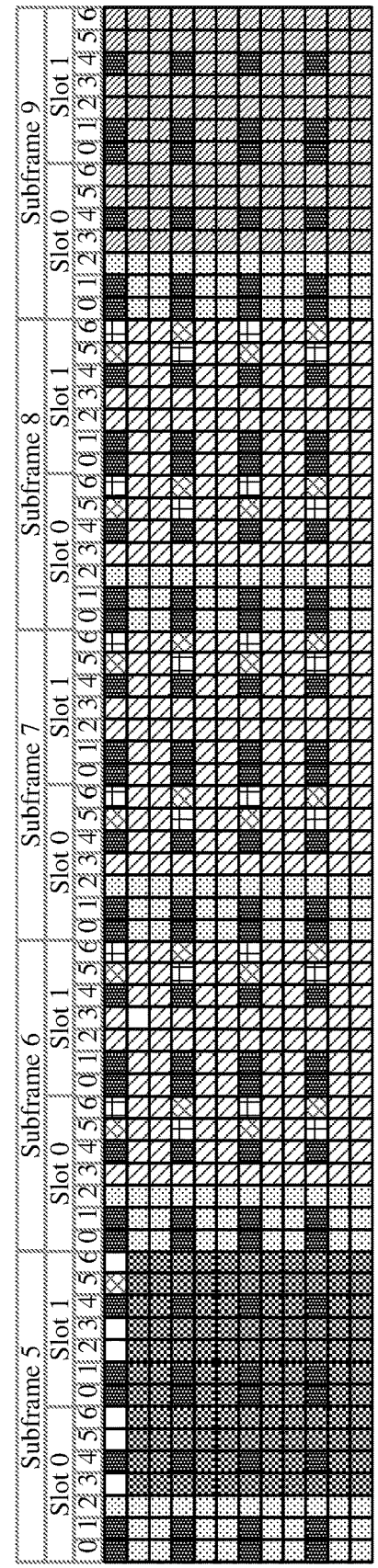
FIG. 3

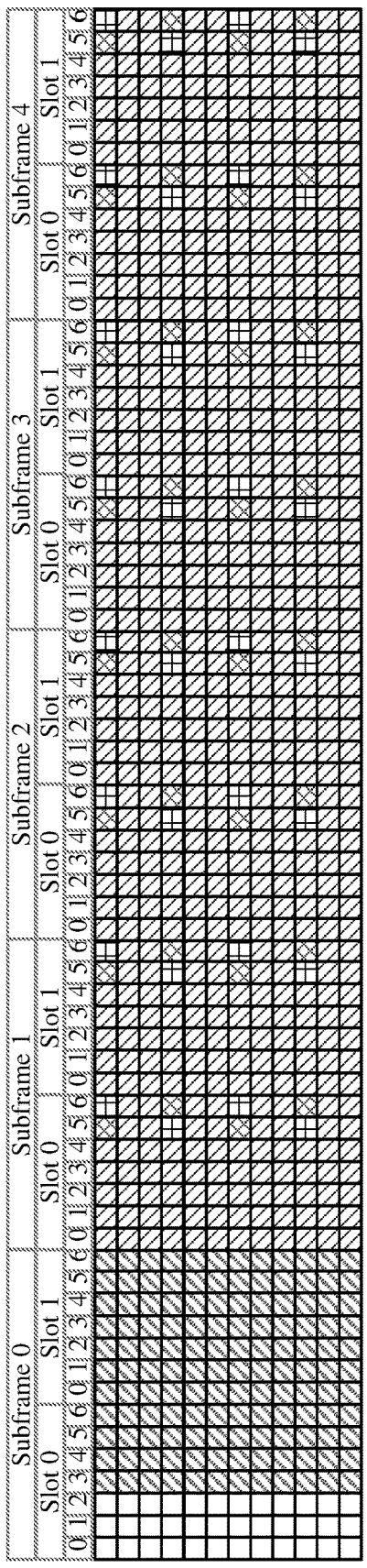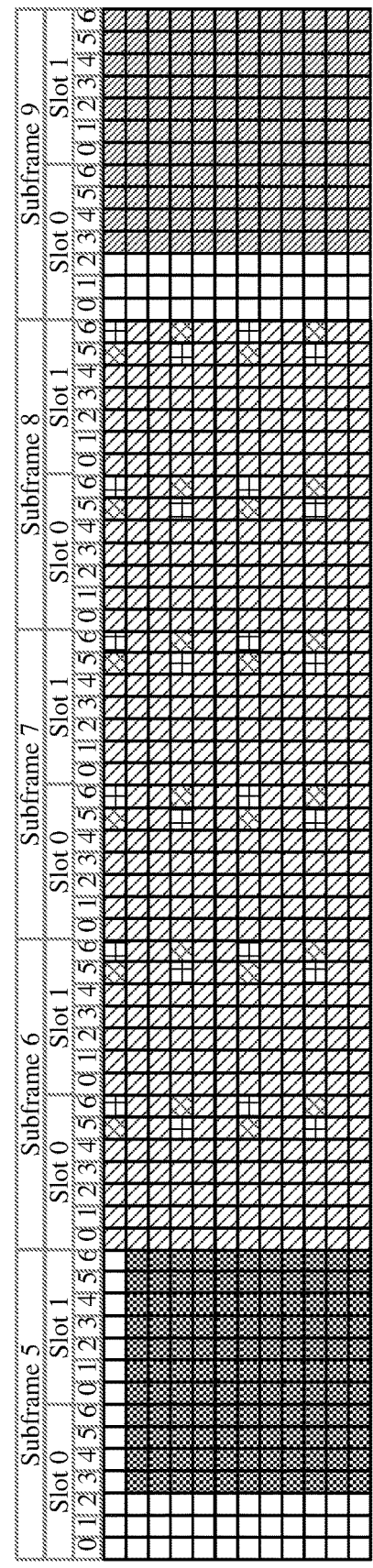
FIG. 5

METHOD AND APPARATUS FOR PROVIDING LINK QUALITY BASED RECEPTION SLEEP MODE FOR NARROWBAND INTERNET OF THINGS DEVICES

CROSS-REFERENCE TO RELATED APPLICATION

This application claims the benefit of Indian Application Serial No. 201941013476, entitled "METHOD AND APPARATUS FOR PROVIDING LINK QUALITY BASED RECEPTION SLEEP MODE FOR NARROWBAND INTERNET OF THINGS DEVICES" and filed on Apr. 3, 2019, which is expressly incorporated by reference herein in its entirety.

BACKGROUND

Field

The present disclosure relates generally to communication systems, and more particularly, to providing link quality based reception (RX) sleep mode for narrowband internet of things (NB-IoT) devices.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple radio access technologies (RATs) have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

A UE may save power by entering a RX sleep mode but by doing so the UE may miss downlink measurement obligations/opportunities thereby potentially reducing performance. As such, there is a need for improved UE RX sleep mode determinations.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a narrowband Internet of thing (NB-IoT) user equipment (UE). Further, the apparatus may be configured to receive NB reference signals (NRS) on a NB channel during a gap between reception events, perform link quality measurements based on the NRS received during an evaluation time interval, the evaluation time interval being shorter than the gap between the reception events, determine whether a link quality is greater than or equal to a first threshold, during the evaluation time interval, based on the link quality measurements, and determine whether to enable an autonomous reception (RX) sleep mode for a remaining duration of the gap between the reception events based at least in part on determining whether the link quality is greater than or equal to the first threshold value.

A method of wireless communication is described. The method may be performed by a NB-IoT UE. Further, the method including receiving NRS on a NB channel during a gap between reception events, performing link quality measurements based on the NRS received during an evaluation time interval, the evaluation time interval being shorter than the gap between the reception events, determining whether a link quality is greater than or equal to a first threshold, during the evaluation time interval, based on the link quality measurements, and determining whether to enable an autonomous RX sleep mode for a remaining duration of the gap between the reception events based at least in part on determining whether the link quality is greater than or equal to the first threshold value.

An apparatus for wireless communication is described. The apparatus may include means for receiving NRS on a NB channel during a gap between reception events, means for performing link quality measurements based on the NRS received during an evaluation time interval, the evaluation time interval being shorter than the gap between the reception events, means for determining whether a link quality is greater than or equal to a first threshold, during the evaluation time interval, based on the link quality measurements, and means for determining whether to enable an autonomous RX sleep mode for a remaining duration of the gap between the reception events based at least in part on determining whether the link quality is greater than or equal to the first threshold value.

A non-transitory computer readable medium for wireless communication is described. The non-transitory computer-readable medium may include instructions to cause a processor to receive NRS on a NB channel during a gap between reception events, perform link quality measurements based on the NRS received during an evaluation time interval, the evaluation time interval being shorter than the gap between the reception events, determine whether a link quality is greater than or equal to a first threshold, during the evaluation time interval, based on the link quality measurements, and determine whether to enable an autonomous RX sleep mode for a remaining duration of the gap between the reception events based at least in part on determining whether the link quality is greater than or equal to the first threshold value.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a DL frame structure, DL channels within the DL frame structure, an UL frame structure, and UL channels within the UL frame structure, respectively.

FIG. 3 is a diagram illustrating an example of a narrowband (NB) frame structure for in-band deployment inside an LTE carrier (even radio frame).

FIG. 5 is a diagram illustrating an example of an NB frame structure for guard band/standalone deployment inside an LTE carrier (even radio frame).

DETAILED DESCRIPTION

Figure 1:
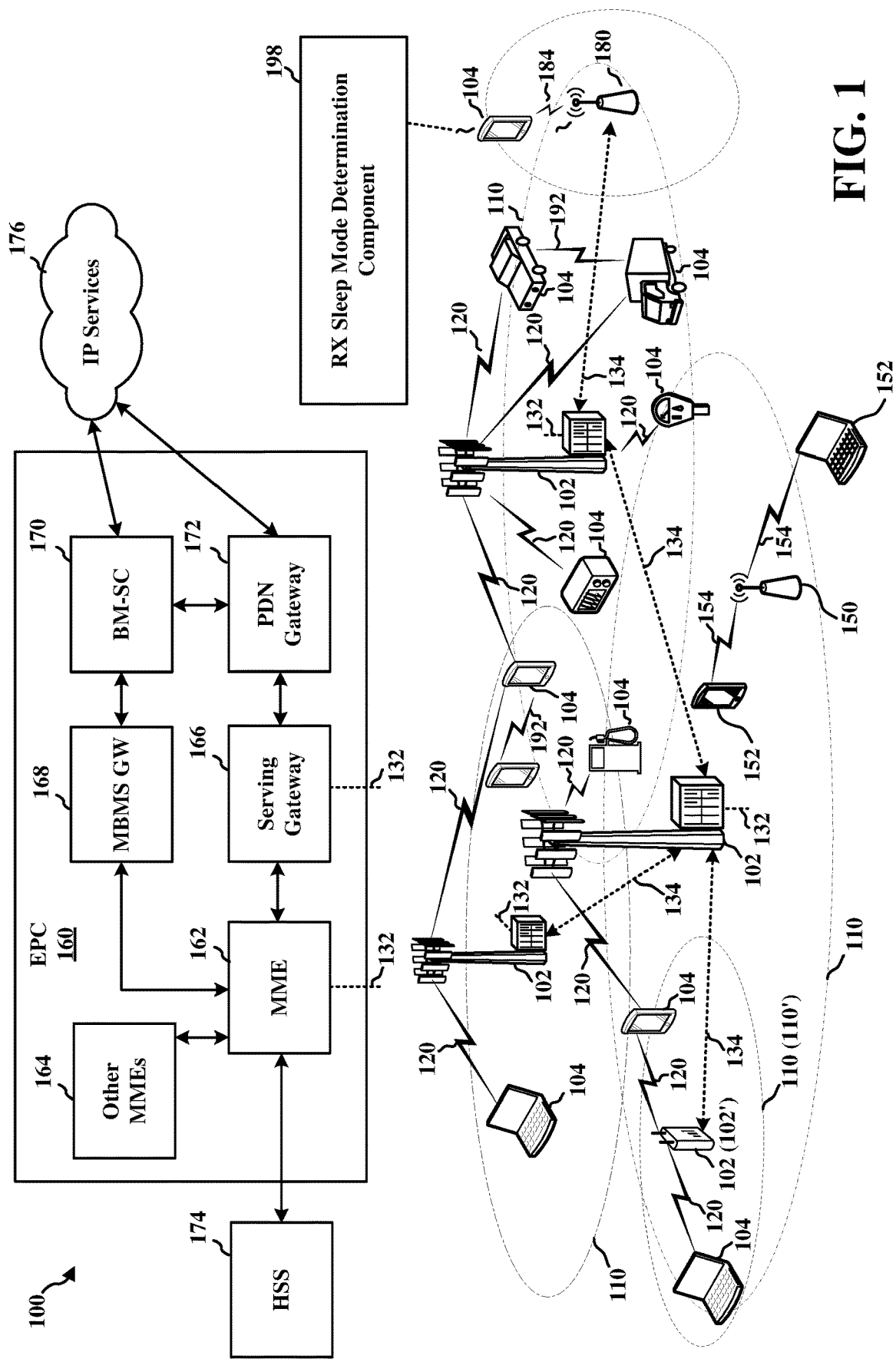
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a RX Sleep Mode determination component 198. Initially, although the following description may be focused towards discussion of autonomous RX sleep mode determinations for a NB-IoT UE 104 in a radio resource control (RRC) connected mode, the concepts described herein may also be applicable to other UEs. As used herein, a NB-IoT UE may refer to a UE that is enabled to communication use a portion of a larger available bandwidth. For example, the UE 104 may be an eMTC based UE, a legacy UE with RRC connected mode RX sleep functionality, etc. Additionally, although the following description may be focused towards LTE NB-IoT descriptions, the concepts described herein may also be applicable to radio access technologies (RATs), For example, 5G new radio (NR), UMTS, GSM, etc.

Further, RX Sleep Mode determination component 198 may assist UE 104 with balancing potential reduced power consumption through use of sleep mode with reduced performance through possible missing of measurements while in sleep mode. Generally, NB-IoT UE 104 in RRC connected mode, may have gaps between reception/measurement events in situations, such as but not limited to, gaps between UE specific search spaces (USS), gaps between reception of narrowband physical downlink control channel (PDCCH) (NPDCCH) and narrow band physical downlink shared channel (PDSCH) (NPDSCH), gaps between NPDSCH and narrow band physical uplink shared channel (PUSCH) (NPUSCH), gaps between NPUSCH and a subsequent USS, downlink scheduling gaps, system information (SI) scheduling gaps, etc. Such gaps may allow NB-IoT UE 104 to enter a sleep mode to conserve power. Additionally, NB-IoT UE 104 may be expected to make downlink measurements using narrow band reference signals (NRS) which may be available without gaps. Such NRS based measurements (e.g., signal to noise (SNR), signal-to-interference-plus-noise ratio (SINR), etc.) may be used to generate block error rate (BLER) estimates, and the BLER estimates may be used to trigger events such as radio link failure (RLF) when link quality is below a threshold value (e.g., $Q_{out}$). In an operational aspect, when NB-IoT UE 104 is in an RX sleep mode during gaps, measurement performance may be affected. For example, less availability of NRSs within a measurement period may decrease link quality estimate accuracy. Further, spare monitoring of NRS may increase measurement latency. As such, RX Sleep Mode determination component 198 may enable UE 104 to perform opportunistic RX sleep modes based at least in part on channel quality.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the PDCCH occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the PUSCH. The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as SIBs, and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data and may additionally be used to carry a buffer status report (BSR), a power headroom report (PHR), and/or UCI.

Figure 4:
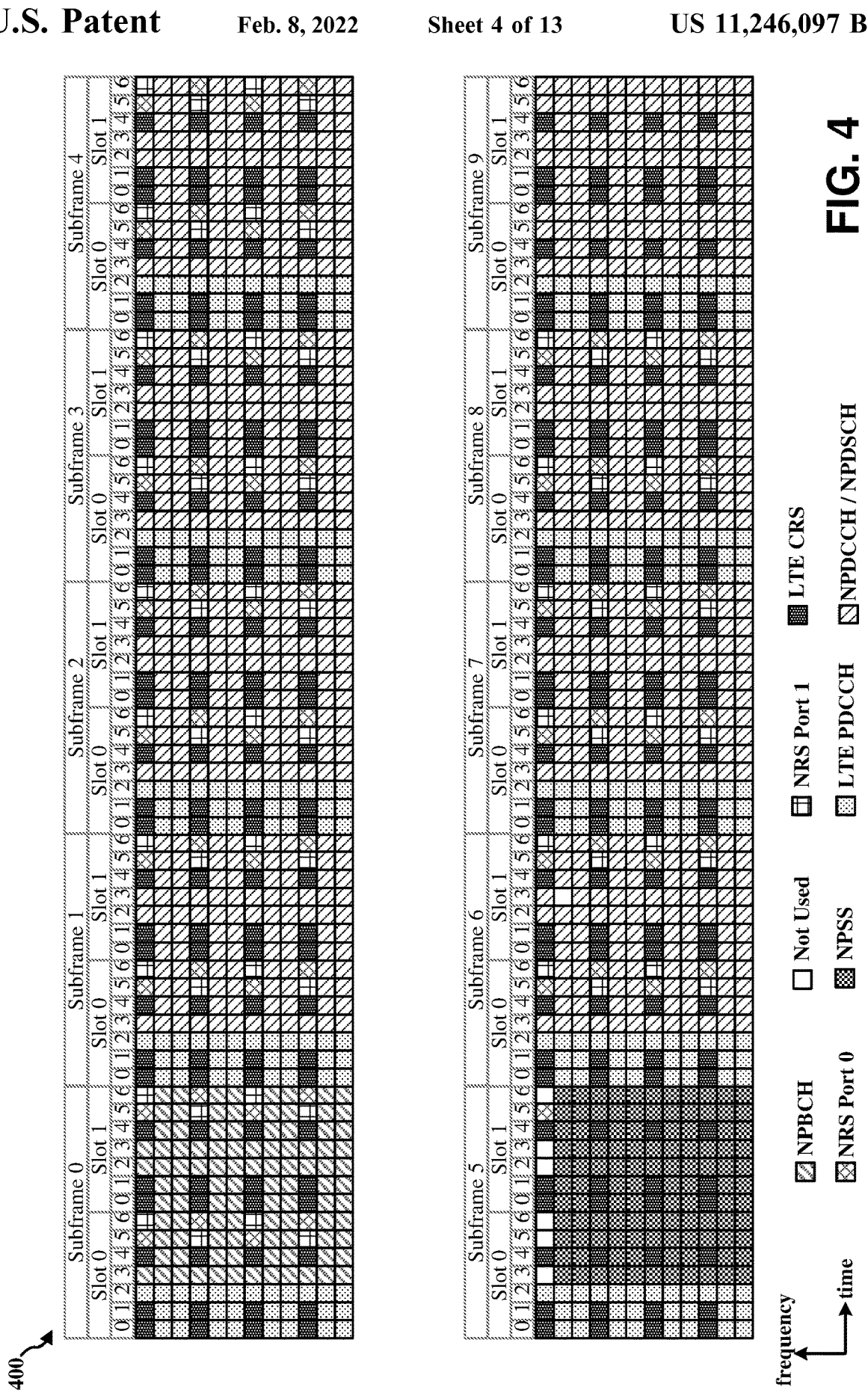
FIG. 4 is a diagram illustrating an example of an NB frame structure for in-band deployment inside an LTE carrier (odd radio frame)
Figure 6:
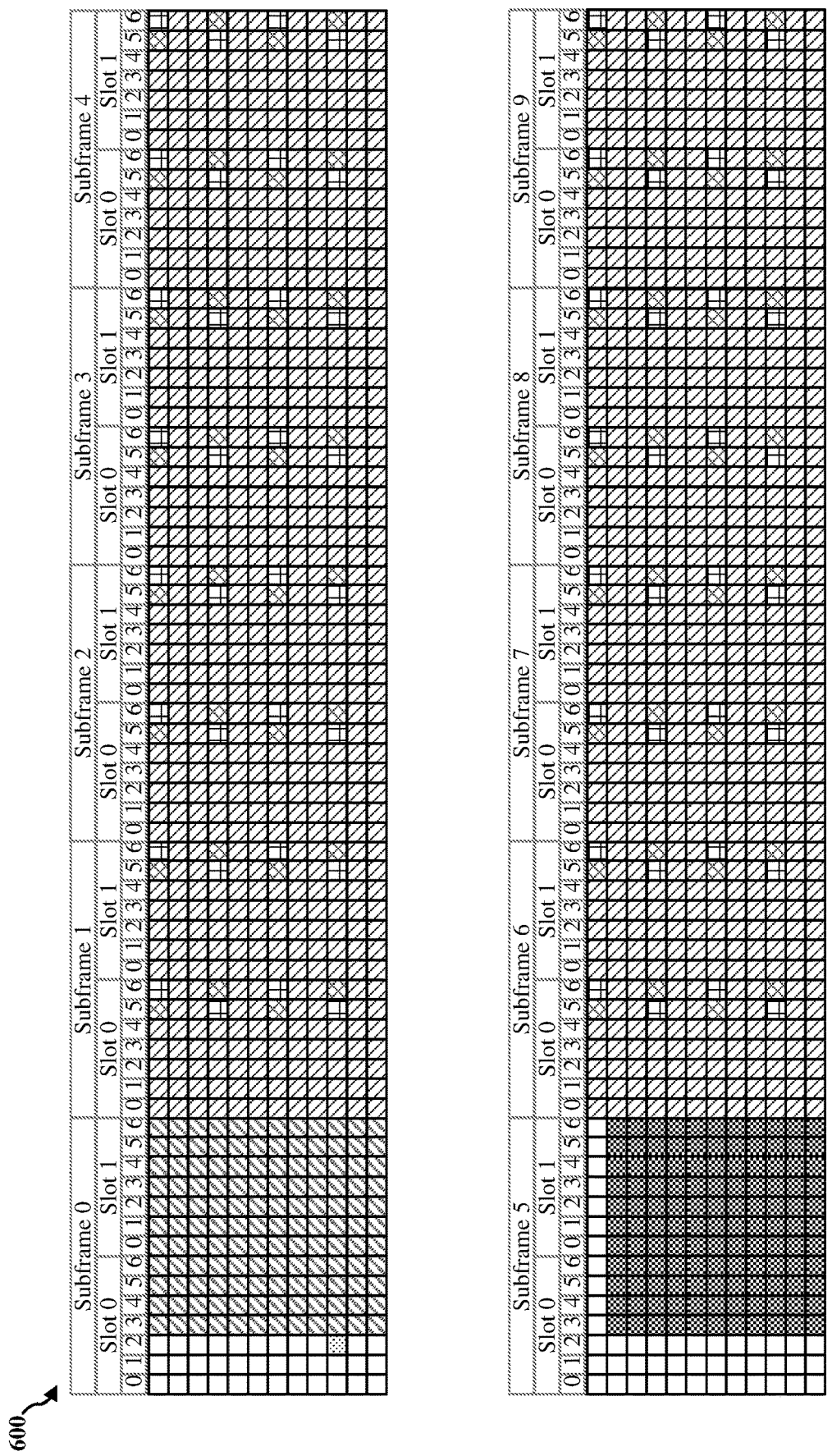
FIG. 6 is a diagram illustrating an example of an NB frame structure for guard band/standalone deployment inside an LTE carrier (odd radio frame).

FIG. 3 is a diagram 300 illustrating an example of an NB frame structure for in-band deployment inside an LTE carrier (even radio frame). FIG. 4 is a diagram 400 illustrating an example of an NB frame structure for in-band deployment inside an LTE carrier (odd radio frame). FIG. 5 is a diagram 500 illustrating an example of an NB frame structure for guard band/standalone deployment inside an LTE carrier (even radio frame). FIG. 6 is a diagram 600 illustrating an example of an NB frame structure for guard band/standalone deployment inside an LTE carrier (odd radio frame). Other wireless communication technologies may have a different frame structure and/or different channels. A radio frame (10 ms) may be divided into 10 equally sized subframes (e.g., subframe 0-subframe 9). Each subframe may include two consecutive time slots (e.g., slot 0 and slot 1). A resource grid may be used to represent the two time slots, each time slot including one or more time concurrent RBs (also referred to as physical RBs (PRBs)) of 180 kHz. The resource grid is divided into multiple resource elements (REs). For a normal cyclic prefix, an RB may contain 12 consecutive subcarriers in the frequency domain and 7 consecutive symbols (for DL, orthogonal frequency-division multiplexing (OFDM) symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme. The in-band deployment of NB-IoT may utilize RBs within an LTE carrier. The guard band deployment of NB-IoT may utilize the unused RBs within an LTE carrier's guard-band. The stand-alone deployment of NB-IoT may utilize RBs within the global system for mobile communications (GSM) carriers.

As illustrated in FIGS. 3-6, some of the REs in each of the subframes carry NB reference signals (NRS) that may be used for broadcast transmission(s) or dedicated DL transmission(s), regardless of whether data is actually transmitted. Depending on the transmission scheme, NRS may be transmitted on one antenna port or on two antenna ports (e.g., antenna port 0 and antenna port 1). The values of the NRS may be similar to cell-specific reference signals (CRS) in LTE. NRS may indicate an NB cell identifier (NCellID), while LTE CRS may indicate a physical cell identifier (PCI). For the in-band deployment, the LTE CRS may also be transmitted in subframes which are not used for Multicast Broadcast Single Frequency Network (MBSFN), as illustrated in FIGS. 3 and 4. Although the structure of the NRS and the LTE CRS may not overlap, the CRS may be taken into account for rate matching and RE mapping purposes. DL transmissions may not use the REs allocated for NRS and/or LTE CRS.

For initial synchronization and in order to determine the NCellID, a narrowband primary synchronization signal (NPSS) may be transmitted in subframe 5 of even and odd radio frames, and a narrowband secondary synchronization signal (NSSS) may be transmitted in subframe 9 in even radio frames. Using in-band deployment, the first three OFDM symbols in each of subframe 5 and subframe 9 may carry the LTE physical downlink control channel (PDCCH), and hence, the first three OFDM symbols in subframes 5 and 9 may not carry NPSS and NSSS, as illustrated in FIGS. 3 and 4. NPSS and the NSSS may be punctured by LTE CRS in the in-band deployment. Using the guard band deployment and/or standalone deployment, the first three OFDM symbols in each of subframe 5 and subframe 9 may be unused, and hence, the first three OFDM symbols in subframes 5 and 9 may not carry the NPSS and NSSS, as illustrated in FIGS. 5 and 6.

The narrowband physical broadcasting channel (NPBCH) may carry the NB master information block (NB-MIB). After physical layer baseband processing, the resulting NB-MIB may be split into eight blocks. The first block may be transmitted in subframe 0 of each radio frame in a set of eight consecutive radio frames. The second block may be transmitted in subframe 0 of each radio frame in the subsequent set of eight consecutive radio frames. The process of NB-MIB block transmission may be continued until the entire NB-MIB is transmitted. By using subframe 0 for all NB-MIB block transmissions, collisions between the NPBCH and a potential LTE MBSFN transmission may be avoided when the in-band deployment of NB-IoT is used. As illustrated in FIGS. 3 and 4, NPBCH symbols may be mapped around the NRS and the LTE CRS for the in-band deployment. As illustrated in FIGS. 5 and 6, the NPBCH may occupy all of subframe 0 except for the first three symbols which are left unused for the guard band deployment and/or standalone deployment.

The principle of a control channel and a shared channel also applies to NB-IoT, defining the NB physical downlink control channel (NPDCCH) and the NB physical downlink shared channel (NPDSCH). Not all subframes may be used for the transmission of dedicated DL channels. In radio resource control (RRC) signaling, a bitmap indicating the valid subframes for NPDCCH and/or NPDSCH may be signaled to the UE. When a subframe is not indicated as valid, an NPDCCH and/or NPDSCH may be postponed until the next valid subframe. The NPDCCH may indicate which UEs have data located in the NPDSCH, where to find the data, and how often the data is repeated. UL grants that indicate REs allocated to a UE for UL data transmission(s) may also be located in the NPDCCH. The NPDCCH may also carry paging and/or system information updates. NPDCCH symbols and NPDSCH symbols may be mapped around the NRS, and for the in-band deployment of NB-IoT, also around the LTE CRS.

As indicated above, FIGS. 3-6 are provided as examples. Other examples are possible and may differ from what was described in connection with FIGS. 3-6.

Figure 7:
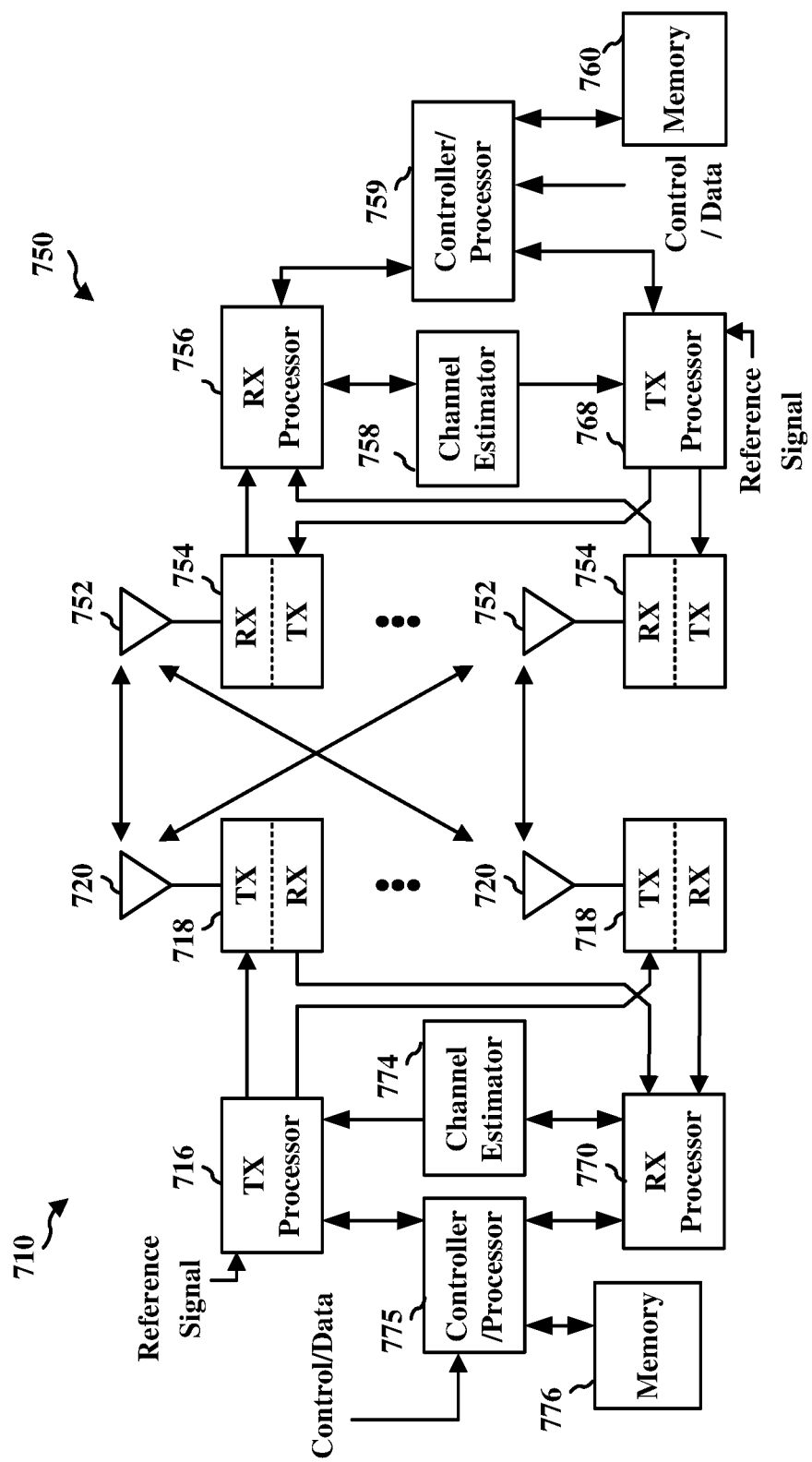
FIG. 7 is a diagram illustrating an example of a base station and user equipment (UE) in an access network.

FIG. 7 is a block diagram of a base station 710 in communication with a UE 750 in an access network. In the DL, IP packets from the EPC 160 may be provided to a controller/processor 775. The controller/processor 775 implements layer 3 and layer 2 functionality. Layer 3 includes a RRC layer, and layer 2 includes a packet data convergence protocol (PDCP) layer, a radio link control (RLC) layer, and a medium access control (MAC) layer. The controller/processor 775 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 716 and the receive (RX) processor 770 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 716 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 774 may be used to determine the coding and modulation scheme, as well as for spatial processing. The channel estimate may be derived from a reference signal and/or channel condition feedback transmitted by the UE 750. Each spatial stream may then be provided to a different antenna 720 via a separate transmitter 718TX. Each transmitter 718TX may modulate an RF carrier with a respective spatial stream for transmission.

At the UE 750, each receiver 754RX receives a signal through its respective antenna 752. Each receiver 754RX recovers information modulated onto an RF carrier and provides the information to the receive (RX) processor 756. The TX processor 768 and the RX processor 756 implement layer 1 functionality associated with various signal processing functions. The RX processor 756 may perform spatial processing on the information to recover any spatial streams destined for the UE 750. If multiple spatial streams are destined for the UE 750, they may be combined by the RX processor 756 into a single OFDM symbol stream. The RX processor 756 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 710. These soft decisions may be based on channel estimates computed by the channel estimator 758. The soft decisions are then decoded and deinterleaved to recover the data and control signals that were originally transmitted by the base station 710 on the physical channel. The data and control signals are then provided to the controller/processor 759, which implements layer 3 and layer 2 functionality.

The controller/processor 759 can be associated with a memory 760 that stores program codes and data. The memory 760 may be referred to as a computer-readable medium. In the UL, the controller/processor 759 provides demultiplexing between transport and logical channels, packet reassembly, deciphering, header decompression, and control signal processing to recover IP packets from the EPC 160. The controller/processor 759 is also responsible for error detection using an ACK and/or NACK protocol to support HARQ operations.

Similar to the functionality described in connection with the DL transmission by the base station 710, the controller/processor 759 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 758 from a reference signal or feedback transmitted by the base station 710 may be used by the TX processor 768 to select the appropriate coding and modulation schemes, and to facilitate spatial processing. The spatial streams generated by the TX processor 768 may be provided to different antenna 752 via separate transmitters 754TX. Each transmitter 754TX may modulate an RF carrier with a respective spatial stream for transmission.

The UL transmission is processed at the base station 710 in a manner similar to that described in connection with the receiver function at the UE 750. Each receiver 718RX receives a signal through its respective antenna 720. Each receiver 718RX recovers information modulated onto an RF carrier and provides the information to a RX processor 770.

The controller/processor 775 can be associated with a memory 776 that stores program codes and data. The memory 776 may be referred to as a computer-readable medium. In the UL, the controller/processor 775 provides demultiplexing between transport and logical channels, packet reassembly, deciphering, header decompression, control signal processing to recover IP packets from the UE 750. IP packets from the controller/processor 775 may be provided to the EPC 160. The controller/processor 775 is also responsible for error detection using an ACK and/or NACK protocol to support HARQ operations.

Figure 8:
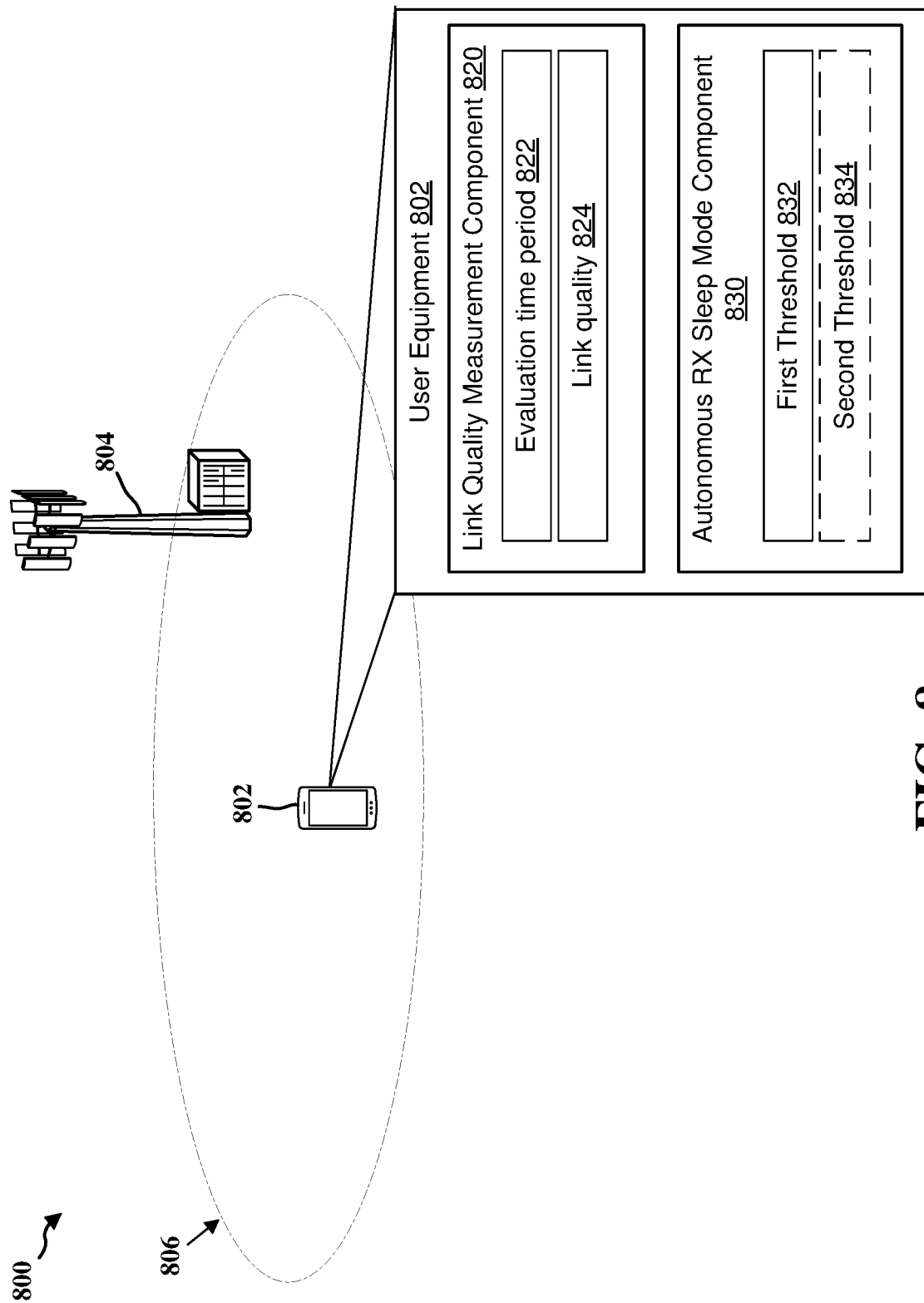
FIG. 8 is a diagram illustrating a wireless communications system with a UE capable of autonomous RX sleep mode determinations in an example aspect.

FIG. 8 is a diagram illustrating an example wireless communications system 800 with a UE 802 that may communicate with base stations 804 using RAT 806. In an aspect, UE 802 may be camped on base station (e.g., eNB, gNB, etc.) in an RRC connected mode state using a RAT 806 (e.g., 5G NR, LTE, 3G, 2G, EV-DO, etc.). For example, UE 802 may be camped on a 5G cell (e.g., communicating with base station 804 using RAT 806). In another example, UE 802 may be camped on a 4G cell (e.g., communicating with base station 804 using RAT 806). In an aspect, UE 802 may be in a NB-IoT based UE, an industrial IoT (IIoT) based UE, an eMTC based UE, etc. Further, UE 802 may be in an RRC Idle mode, an RRC inactive mode, an RRC connected mode, etc.

UE 802 may include link quality measurement component 820 that enables UE 802 to measure channel quality parameters to assist autonomous RX sleep mode component 830 with determining when to enable reception sleep mode (e.g., while in an RRC connected state).

In an operational aspect, autonomous RX sleep mode component 830 may obtain link quality measurement values (e.g., SNR, SINR, etc.) values from link quality measurement component 820 and evaluate BLER (e.g., average BLER) values for each evaluation time period 822 (e.g., $T_{eval}$). For example, a value derived from a maximum number of repetition ($R_{max}$) of information being sent to UE 802 on a downlink channel (e.g., NPDCCH, NPDSCH, etc.) may be used to determine the link quality 824. In an example aspect, the average BLER of $R_{max}/4$ for the evaluation time period 822 may be used to determine the link quality 824. During each evaluation time period 822, the link quality 824 may be compared with a first threshold 832. As an example, the first threshold 832 may be a BLER rate of 1, percent, 2 percent, etc. In an aspect, if link quality 824 is greater than the first threshold 832, then autonomous RX sleep mode component 830 may enable an RX sleep mode for UE 802. Such evaluates may occur at the beginning, during, or end of each evaluation time period 822. In an aspect, the RX sleep mode may continue for a set time duration. For example, as noted above, the RX sleep mode may continue until a next reception event. In other examples, the RX sleep mode may be evaluated periodically and/or for a configurable duration.

Additionally, in an optional aspect, a second threshold 834 may also be used to assist autonomous RX sleep mode component 830 in determining when to prompt UE 802 to enable the RX sleep mode for UE 802. In such an optional aspect, the second threshold may be associated with a different link quality related value. For example, an out-of-sync timer (e.g., T310 timer) may run when the UE 802 determines that the UE 802 is out of synchronization with base station 804. The T310 timer may be started when a signal quality falls below a value (e.g., second threshold, $Q_{out}$). Once the T310 timer reaches a defined value, and the link quality is still below $Q_{out}$, a radio link failure (RLF) is declared. In such an optional operational aspect, if link quality 824 is greater than first threshold 832 and the T310 timer is not running (e.g., link quality 824 is greater than second threshold 834), then autonomous RX sleep mode component 830 may enable the RX sleep mode for UE 802. In the contrary, if either link quality 824 is less than or equal to first threshold 832 or the T310 timer is running (e.g., link quality 824 is less than or equal to second threshold 834), then autonomous RX sleep mode component 830 may prohibit enablement (e.g., disable) of the RX sleep mode for UE 802.

Figure 9:
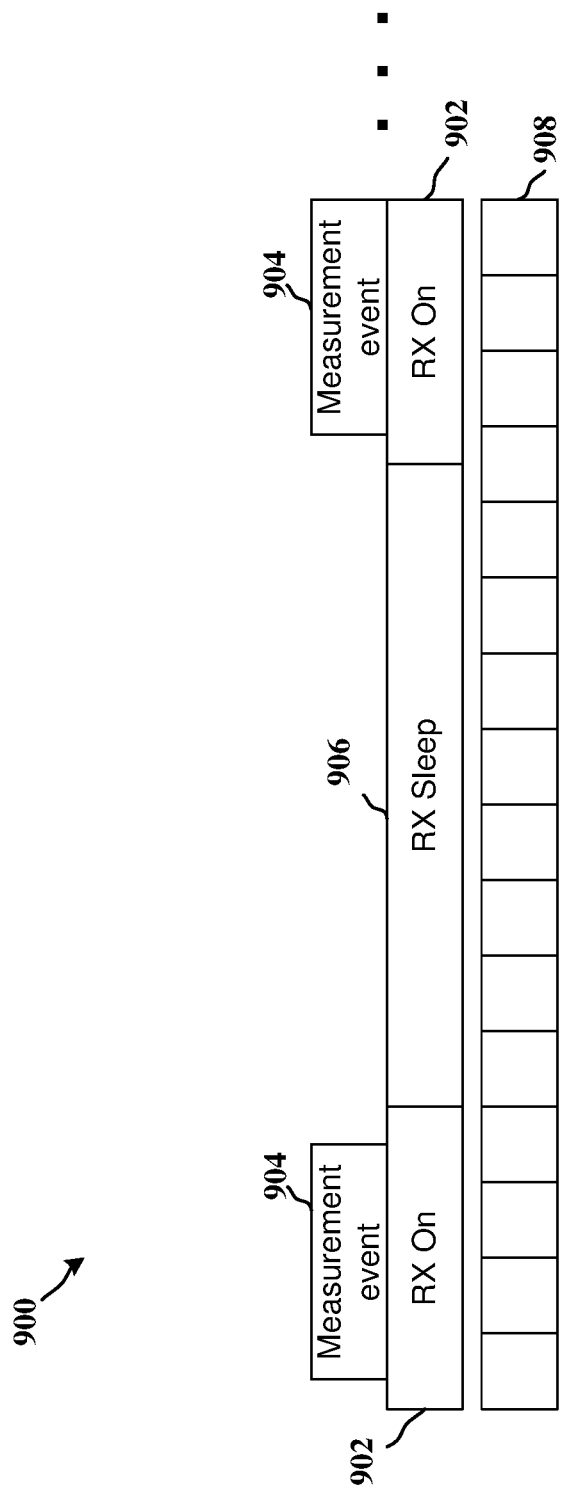
FIG. 9 is a diagram illustrating a sleep mode and measurement event timeline in an example aspect.

FIG. 9 is a diagram 900 illustrating a sleep mode and measurement event timeline. In an operational aspect, while a UE (e.g., UE 104, UE 750, UE 802) is in an RRC connected mode state and/or a reception active mode 902 (RX on), a measurement event 904 may occur. As noted above, measurement events 904, may include but are not limited to, measurements/reception of UE specific search spaces (USS), NPDCCH, NPDSCH, downlink scheduling, system information (SI), etc. Once a measurement event 904 has been completed, the UE may have an opportunity to enter a RX sleep mode 906 during a gap before the next measurement event 904. the UE may determine whether to enter the RX sleep mode 906 based at least in part on one or more link quality values. In an example operational aspect, a UE may evaluate link quality values during each evaluation time interval 908. An evaluation time interval 908 may have a time duration of a symbol, multiple symbols, a fraction of a millisecond, a millisecond, multiple milliseconds, a faction of a time between measurement events 904, etc. As noted above, if the UE determines that the link quality value(s) are above at least a first threshold, then the UE may enter a RX sleep mode 906. In an aspect, the UE may enter the sleep mode at the beginning, during or end of the evaluation time interval 908. In another aspect, the UE may continue to operate in an RX sleep mode 906 until a subsequent measurement event 904 is expected/scheduled. In an aspect, the RX sleep mode 906 may skip one or more scheduled measurement events 904. Such skipping of measurement events 904 may be associated with link quality values. In yet another aspect, RX sleep mode 906 may be disabled when the UE determines that link quality values are below at least one of the threshold values measured during an evaluation time interval 908 while the UE is in RX sleep mode 906.

Figure 10:
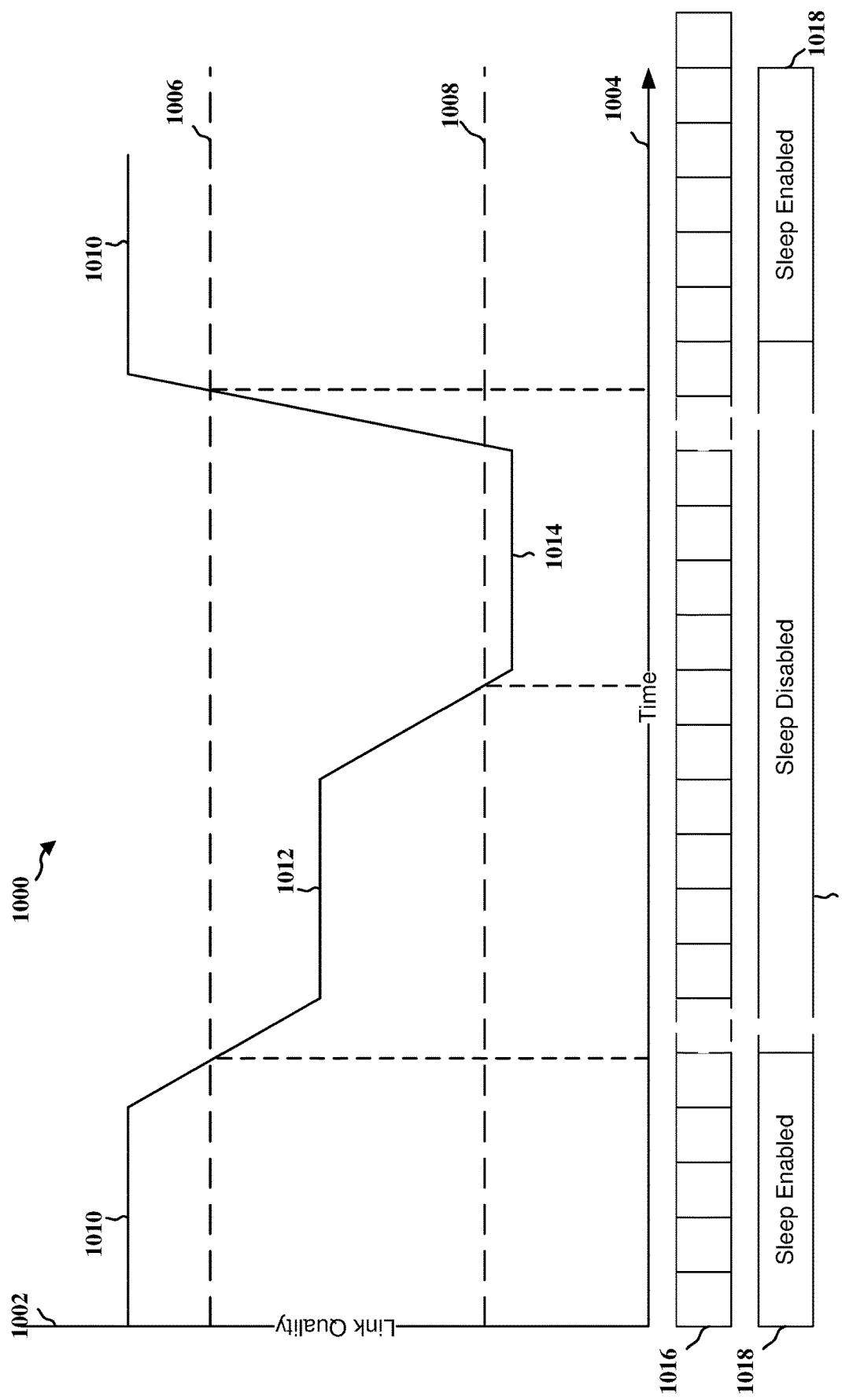
FIG. 10 is a diagram illustrating a threshold based UE autonomous RX sleep mode determination timeline in an example aspect.

FIG. 10 is a diagram 1000 illustrating a threshold based UE autonomous RX sleep mode determination timeline. In the depicted aspect, the y-axis represents link quality values 1002 and the x-axis represents passage of time 1004. Further the diagram 1000 depicts UE sleep states (e.g., RX sleep enabled 1018, RX sleep disabled 1020) as various link quality 1002 values (e.g., 1010, 1012, 1014) are evaluated against thresholds e.g., (first threshold 1006, second threshold 1008). Such evaluations may occur based on evaluation time intervals 1016.

In an operational aspect, a UE (e.g., UE 104, UE 750, UE 802) may determine that link quality 1002 (e.g., BLER) is at a first link quality value/level 1010. While the UE link quality is at the first link quality level 1010, the UE may evaluate, during an evaluation time intervals 1016, whether a RX sleep mode should be enabled. In the depicted example, first link quality value 1010 is greater than first threshold 1006, and, as such, RX sleep mode may be enabled 1018. Optionally, first link quality value 1010 is also greater than second threshold 1008. The second threshold may be associated with another link quality metric, such as but not limited to, an out-of-sync determination which may trigger starting of a T310 timer. As time 1004 progresses, the depicted link quality 1002 changes to second link quality value/level 1012. In the depicted aspect, as the second link quality value/level 1012 is less than the first threshold 1006, then the UE may disable RX sleep mode 1020. In optional aspect, RX sleep mode may still be enabled as second link quality value/level 1012 has not dropped below the second threshold 1008. As time 1004 continues to progress, the depicted link quality 1002 changes to third link quality value/level 1014. As noted above, as the second link quality value/level 1012 is less than the first threshold 1006 (and the second threshold 1008), then the UE may continue in an RX sleep mode disabled state 1020. As time 1004 continues to progress, the depicted link quality 1002 return to the first link quality value/level 1010, or a similar value. As noted above, first link quality value 1010 is greater than first threshold 1006, and, as such, RX sleep mode may be enabled 1018. Further optionally, first link quality value 1010 is also greater than second threshold 1008 and, in an optional aspect, RX sleep mode 1018 may only be enabled when the link quality value 1010 is greater than both the first threshold 1006 and second threshold 1008.

Figure 11:
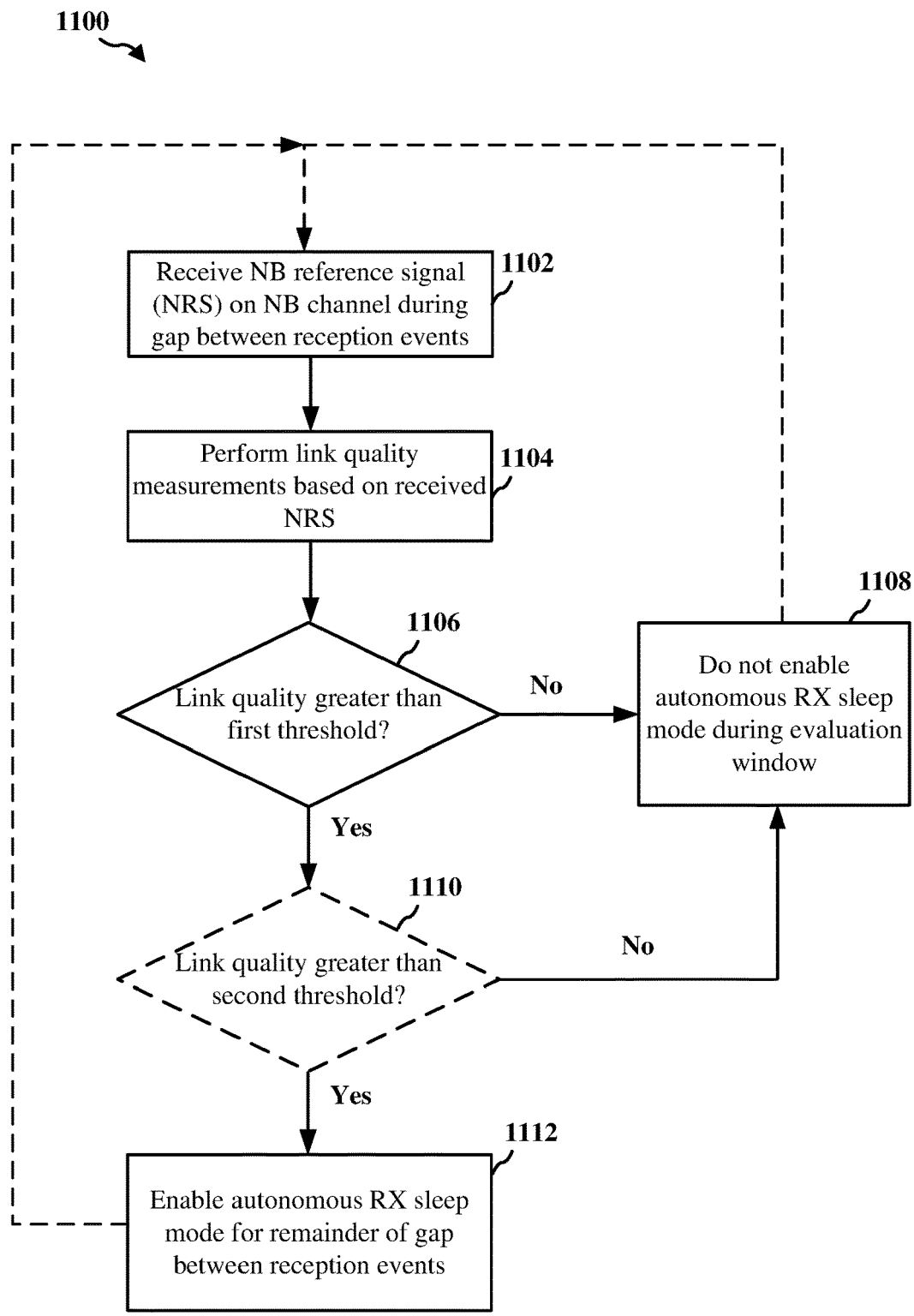
FIG. 11 is a flowchart of a method of wireless communication.

FIG. 11 is a flowchart 1100 of a method of wireless communication. The method may be performed by a UE (e.g., UE 104, UE 750, UE 802). In an aspect, the UE may be a NB-IoT based UE. Further, in an aspect, the NB-IoT based UE may be operating in an RRC connected mode.

At 1102, the UE may receive reference signals (RSs) to aid in determining characteristics of one or more received channels. In an aspect, the RSs may be NRS and the one or more received channel may be a NB channels (e.g., NPDCCH, PPDSCH, etc.). Further, the NRS may be received during a gap between reception events. In such an aspect, the gap between the reception events may include a time between UE specific search spaces, a time between reception NPDCCH and reception of a NPDSCH, a time between reception of NPRDSCH and a UE specific search space, a time between reception of system information (SI) scheduling, etc. In an aspect, UE 802 link quality measurement component 420 may be configured to receive the RSs such as described at 1102.

At 1104, the UE may perform link quality measurements based on the received RSs to obtain a link quality value. In an aspect, the link quality measurements may be determined based on a BLER. In such an aspect, the BLER may be an average BLER estimated based on a maximum number of repetition cycles ($R_{max}$) divided by a whole number (e.g., 2, 4, 8, etc.) and signal to noise ratio (SNR) measurement. As used herein, $R_{max}$ may be the maximum number of repetitions in a transmission. For example, a UE may receive multiple copies of information (up to $R_{max}$) in us UE search space. The $R_{max}$ value may be provided to the UE as part of higher level messaging. In an aspect, UE 802 link quality measurement component 820 may be configured to perform the link quality measurements as described at 1104.

At 1106, the UE may determine whether the link quality value is greater than a first threshold value. In an aspect, the first threshold may be a defined percentage of an error rate (e.g., 1% BLER, 2% BLER, etc.). In an aspect, the UE may make the determination at the beginning, during or at the end of an evaluation time interval. As used herein, an evaluation time interval may be a duration of time, generally shorter than a gap between reception events (e.g., a symbol, multiple symbols, a fraction of a millisecond, a millisecond, multiple milliseconds, a faction of a time between measurement events, etc.). For example, when a UE is camped on a 5G NR based cell, the UE may not be able to receive content via a broadcast communication. In another example, when the UE is camped on the 5G NR based call, the UE may be able to receive content via a unicast communication. In an aspect, UE 802 autonomous RX sleep mode component 830 may determine whether the link quality value is greater than a first threshold value as described at 1106. If at 1106, the UE determines that the link quality value is not greater than the first threshold value, then at 1108, the UE may prohibit enablement (e.g., disable) of the autonomous RX sleep mode. In an aspect, UE 802 autonomous RX sleep mode component 830 may prohibit enablement (e.g., disable) of the autonomous RX sleep mode as described at 1108. Further, in an optional aspect, once the UE is prohibited from entering the autonomous RX sleep mode, the process 1100 may return to 1102 and restarted at a subsequent evaluation time interval.

In an optional aspect, if at 1106, the UE determines that the link quality value is greater than the first threshold value, then at 1110, the UE may determine whether another link quality related metric exceeds a second threshold. For example, when a link quality drops below a second threshold value (e.g., $Q_{out}$) a T310 timer may be started. In such an aspect, at 1110, if the UE determines that the T310 timer has been started, then the UE may prohibit enablement (e.g., disable) of the autonomous RX sleep mode. In other words, at 1106 the UE may optionally determine if the link quality value is above $Q_{out}$ (the second threshold). In an aspect, UE 802 autonomous RX sleep mode component 830 may determine whether the link quality value is greater than the second threshold value as described optionally at 1110. In such an optional aspect, if at 1110, the UE determines that the link quality value is greater than the second threshold, then, at 1112, the UE enables an autonomous RX sleep mode. In another aspect, if at 1106, the UE determines that the link quality value is greater than the first threshold value, then at 1112, UE enables an autonomous RX sleep mode. In an aspect, UE 802 autonomous RX sleep mode component 830 may enable the autonomous RX sleep mode as described at 1112. In an aspect, the UE may maintain the RX sleep mode (e.g., power down reception components and/or not receive and process any signaling) for a defined period of time. In an aspect, the defined period of time may be associated with timing of a subsequent reception event. In other aspect, the defined period of time may be associated with the evaluation time interval (e.g., maintain sleep mode for a defined number of evaluation time intervals, etc.). In an optional aspect, once a defined period of time has expired, the process 1100 may return to 1102.

Figure 12:
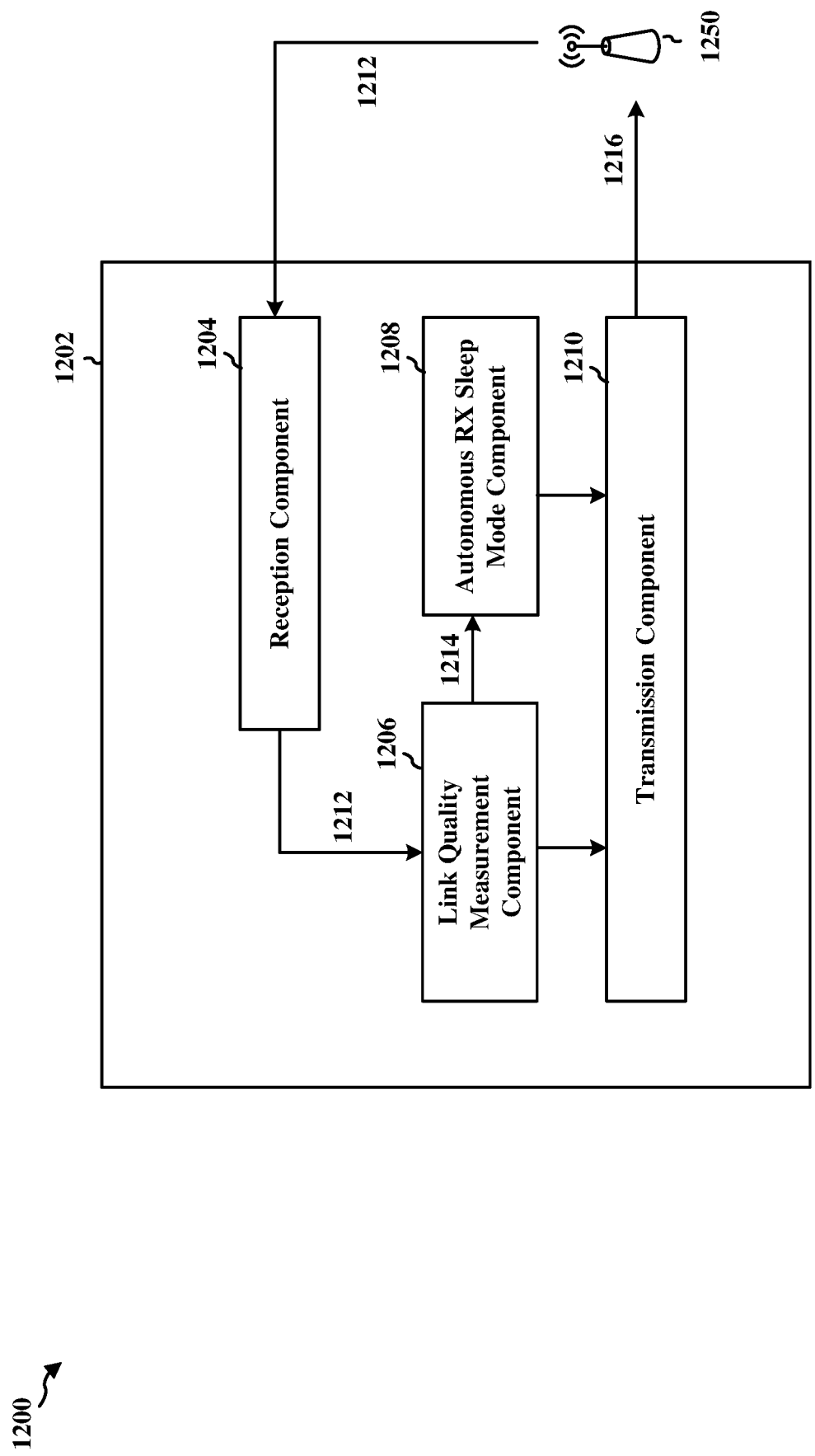
FIG. 12 is a conceptual data flow diagram illustrating the data flow between different means/components in an example apparatus.

FIG. 12 is a conceptual data flow diagram 1200 illustrating the data flow between different components in an exemplary apparatus 1202. The apparatus may be a UE. The apparatus includes a reception component 1204 that may receive information 1212 from the network 1250, link quality measurement component 1206 that may, based at least partially on the received information 1212, determine one or more link quality values 1214, a autonomous RX sleep mode component 1208 that may enable UE 1202 to determine whether to enter a RX sleep mode during gaps between reception of information 1212. Further, UE 1202 may include a transmission component 1210 to enable to UE 800 to transmit uplink information 1216 (data, control information, etc.) to network 1250.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
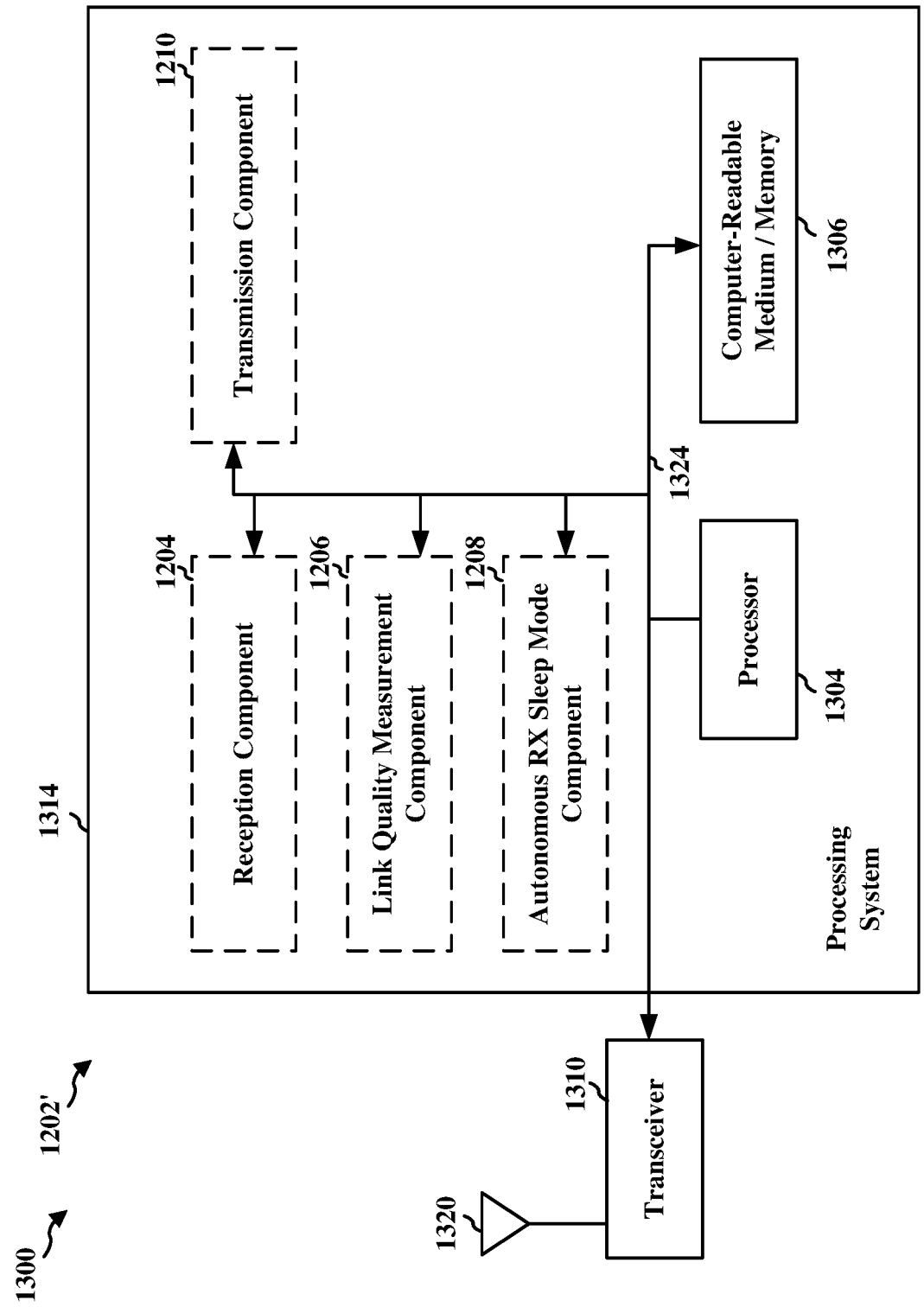
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210 and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 910 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1210, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 804, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210. The components may be software components running in the processor 1304, resident/stored in the computer readable medium/memory 1306, one or more hardware components coupled to the processor 1304, or some combination thereof. The processing system 1314 may be a component of the UE 750 and may include the memory 760 and/or at least one of the TX processor 768, the RX processor 756, and the controller/processor 759.

In one configuration, the apparatus 1202/1202' for wireless communication includes means for receiving NRS on a NB channel during a gap between reception events, means for performing link quality measurements based on the NRS received during an evaluation time interval. In an aspect, the evaluation time interval may be shorter than the gap between the reception events. The apparatus 1202/1202' for wireless communication further include means for determining whether a link quality is greater than or equal to a first threshold, during the evaluation time interval, based on the link quality measurements, and means for determining whether to enable an autonomous reception (RX) sleep mode for a remaining duration of the gap between the reception events based at least in part on determining whether the link quality is greater than or equal to the first threshold value. Additionally, apparatus 1202/1202' for wireless communication further include means for enabling the autonomous RX sleep mode for the remaining duration of the gap between the reception events based on determining that the link quality is greater than or equal to the first threshold value. The aforementioned means may be one or more of the aforementioned components of the apparatus 1202 and/or the processing system 1314 of the apparatus 1202' configured to perform the functions recited by the aforementioned means. As described supra, the processing system 914 may include the TX Processor 768, the RX Processor 756, and the controller/processor 759. As such, in one configuration, the aforementioned means may be the TX Processor 768, the RX Processor 756, and the controller/processor 759 configured to perform the functions recited by the aforementioned means.

Further disclosure is included in the Appendix.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communications, by a narrowband Internet of thing (NB-IoT) user equipment (UE), comprising:
  receiving NB reference signals (NRS) on a NB channel during a gap between reception events;
  performing link quality measurements based on the NRS received during an evaluation time interval, the evaluation time interval being shorter than the gap between the reception events;
  determining whether a link quality is greater than or equal to a first threshold, during the evaluation time interval, based on the link quality measurements; and
  determining whether to enable an autonomous reception (RX) sleep mode for a remaining duration of the gap between the reception events based at least in part on determining whether the link quality is greater than or equal to the first threshold value.

2. The method of claim 1, further comprising:
  enabling the autonomous RX sleep mode for the remaining duration of the gap between the reception events based on determining that the link quality is greater than or equal to the first threshold value.

3. The method of claim 1, further comprising determining whether an out-of-sync timer has been started during the evaluation time interval, and wherein determining whether to enable the autonomous RX sleep mode further comprises:

enabling the autonomous RX sleep mode for the remaining duration of the gap between the reception events based on determining that the link quality is greater than or equal to the first threshold value and based on determining that the out-of-sync timer has not been started; or prohibiting enablement of the autonomous RX sleep mode based on determining that at least one of the link quality is less than to the first threshold value or based on determining that the out-of-sync timer has been started.

4. The method of claim 1, wherein the NB-IoT UE is operating in a Radio Resource Control (RRC) connected mode.

5. The method of claim 1, wherein the gap between the reception events comprises:
a time between UE specific search spaces;
a time between reception of narrowband physical downlink control channel (NPDCCH) and reception of a narrowband physical downlink shared channel (NPDSCH);
a time between reception of NPDSCH and a UE specific search space;
a time between reception of system information (SI) scheduling; or
any combination thereof.

6. The method of claim 1, wherein the link quality measurements comprises a block error rate (BLER) for a maximum number of repetition cycles (Rmax) divided by a whole number into which Rmax can be evenly divided.

7. The method of claim 6, wherein the whole number is 4.

8. The method of claim 3, wherein when the autonomous RX sleep mode is prohibited during the evaluation time interval, the method further comprising:
performing subsequent link quality measurements based on the NRS received during a subsequent evaluation time interval;
determining that the link quality is greater than or equal to the first threshold, during the subsequent evaluation time interval, based on the subsequent link quality measurements;
determining that the out-of-sync timer has not been started; and
enabling the autonomous RX sleep mode for the remaining duration of the gap between the reception events.

9. An apparatus for communicating, by a narrowband Internet of thing (NB-IoT) user equipment (UE), in a wireless network, comprising:
a transceiver;
at least one processor communicatively coupled with the transceiver via a bus for communicating in the wireless network; and
a memory communicatively coupled with the at least one processor and/or the transceiver via the bus;
wherein the at least one processor or the memory are operable to:
receive, via the transceiver, NB reference signals (NRS) on a NB channel during a gap between reception events;
perform link quality measurements based on the NRS received during an evaluation time interval, the evaluation time interval being shorter than the gap between the reception events;
determine whether a link quality is greater than or equal to a first threshold, during the evaluation time interval, based on the link quality measurements; and
determine whether to enable an autonomous reception (RX) sleep mode for a remaining duration of the gap between the reception events based at least in part on determining whether the link quality is greater than or equal to the first threshold value.

10. The apparatus of claim 9, wherein the at least one processor is further operable to:
enable the autonomous RX sleep mode for the remaining duration of the gap between the reception events based on determining that the link quality is greater than or equal to the first threshold value.

11. The apparatus of claim 9, wherein the at least one processor is further operable to determine whether an out-of-sync timer has been started during the evaluation time interval, and wherein the determination of whether to enable the autonomous RX sleep mode further comprises:
enabling the autonomous RX sleep mode for the remaining duration of the gap between the reception events based on determining that the link quality is greater than or equal to the first threshold value and based on determining that the out-of-sync timer has not been started; or
prohibiting enablement of the autonomous RX sleep mode based on determining that at least one of the link quality is less than to the first threshold value or based on determining that the out-of-sync timer has been started.

12. The apparatus of claim 9, wherein the NB-IoT UE is operating in a Radio Resource Control (RRC) connected mode.

13. The apparatus of claim 9, wherein the gap between the reception events comprises:
a time between UE specific search spaces;
a time between reception of narrowband physical downlink control channel (NPDCCH) and reception of a narrowband physical downlink shared channel (NPDSCH);
a time between reception of NPDSCH and a UE specific search space;
a time between reception of system information (SI) scheduling; or
any combination thereof.

14. The apparatus of claim 9, wherein the link quality measurements comprises a block error rate (BLER) for a maximum number of repetition cycles (Rmax) divided by a whole number into which Rmax can be evenly divided.

15. The apparatus of claim 14, wherein the whole number is 4.

16. The apparatus of claim 11, wherein when the autonomous RX sleep mode is prohibited during the evaluation time interval, and wherein the at least one processor is further operable to:
perform subsequent link quality measurements based on the NRS received during a subsequent evaluation time interval;
determine that the link quality is greater than or equal to the first threshold, during the subsequent evaluation time interval, based on the subsequent link quality measurements;
determine that the out-of-sync timer has not been started; and
enable the autonomous RX sleep mode for the remaining duration of the gap between the reception events.

17. An apparatus for wireless communications, by a narrowband Internet of thing (NB-IoT) user equipment (UE), comprising:
- means for receiving NB reference signals (NRS) on a NB channel during a gap between reception events;
- means for performing link quality measurements based on the NRS received during an evaluation time interval, the evaluation time interval being shorter than the gap between the reception events;
- means for determining whether a link quality is greater than or equal to a first threshold, during the evaluation time interval, based on the link quality measurements; and
- means for determining whether to enable an autonomous reception (RX) sleep mode for a remaining duration of the gap between the reception events based at least in part on determining whether the link quality is greater than or equal to the first threshold value.

18. The apparatus of claim 17, further comprising:
- means for enabling the autonomous RX sleep mode for the remaining duration of the gap between the reception events based on determining that the link quality is greater than or equal to the first threshold value.

19. The apparatus of claim 17, further comprising means for determining whether an out-of-sync timer has been started during the evaluation time interval, and wherein the means for determining whether to enable the autonomous RX sleep mode further comprises:
- means for enabling the autonomous RX sleep mode for the remaining duration of the gap between the reception events based on determining that the link quality is greater than or equal to the first threshold value and based on determining that the out-of-sync timer has not been started; or
- means for prohibiting enablement of the autonomous RX sleep mode based on determining that at least one of the link quality is less than to the first threshold value or based on determining that the out-of-sync timer has been started.

20. The apparatus of claim 17, wherein the NB-IoT UE is operating in a Radio Resource Control (RRC) connected mode.

21. The apparatus of claim 17, wherein the gap between the reception events comprises:
- a time between UE specific search spaces;
- a time between reception of narrowband physical downlink control channel (NPDCCH) and reception of a narrowband physical downlink shared channel (NPDSCH);
- a time between reception of NPDSCH and a UE specific search space;
- a time between reception of system information (SI) scheduling; or
- any combination thereof.

22. The apparatus of claim 17, wherein the link quality measurements comprises a block error rate (BLER) for a maximum number of repetition cycles (Rmax) divided by a whole number into which Rmax can be evenly divided.

23. The apparatus of claim 22, wherein the whole number is 4.

24. The apparatus of claim 19, wherein when the autonomous RX sleep mode is prohibited during the evaluation time interval, the apparatus further comprises:
- means for performing subsequent link quality measurements based on the NRS received during a subsequent evaluation time interval;
- means for determining that the link quality is greater than or equal to the first threshold, during the subsequent evaluation time interval, based on the subsequent link quality measurements;
- means for determining that the out-of-sync timer has not been started; and
- means for enabling the autonomous RX sleep mode for the remaining duration of the gap between the reception events.

25. A non-transitory computer-readable storage medium comprising computer-executable code for communicating in a wireless network, the code comprising:
- code for receiving NB reference signals (NRS) on a NB channel during a gap between reception events;
- code for performing link quality measurements based on the NRS received during an evaluation time interval, the evaluation time interval being shorter than the gap between the reception events;
- code for determining whether a link quality is greater than or equal to a first threshold, during the evaluation time interval, based on the link quality measurements; and
- code for determining whether to enable an autonomous reception (RX) sleep mode for a remaining duration of the gap between the reception events based at least in part on determining whether the link quality is greater than or equal to the first threshold value.

26. The non-transitory computer-readable storage medium of claim 25, wherein the code further comprises:
- code for enabling the autonomous RX sleep mode for the remaining duration of the gap between the reception events based on determining that the link quality is greater than or equal to the first threshold value.

27. The non-transitory computer-readable storage medium of claim 25, wherein the code further comprises determining whether an out-of-sync timer has been started during the evaluation time interval, and wherein the code for determining whether to enable the autonomous RX sleep mode further comprises:
- code for enabling the autonomous RX sleep mode for the remaining duration of the gap between the reception events based on determining that the link quality is greater than or equal to the first threshold value and based on determining that the out-of-sync timer has not been started; or
- code for prohibiting enablement of the autonomous RX sleep mode based on determining that at least one of the link quality is less than to the first threshold value or based on determining that the out-of-sync timer has been started.

28. The non-transitory computer-readable storage medium of claim 25, further comprises code for operating in a Radio Resource Control (RRC) connected mode.

29. The non-transitory computer-readable storage medium of claim 25, wherein the gap between the reception events comprises:
- a time between UE specific search spaces;
- a time between reception of narrowband physical downlink control channel (NPDCCH) and reception of a narrowband physical downlink shared channel (NPDSCH);
- a time between reception of NPDSCH and a UE specific search space;
- a time between reception of system information (SI) scheduling; or
- any combination thereof.

30. The non-transitory computer-readable storage medium of claim 25, wherein the link quality measurements comprises a block error rate (BLER) for a maximum number of repetition cycles (Rmax) divided by a whole number into which Rmax can be evenly divided.

\* \* \* \* \*